(12) United States Patent
Nakamura et al.

(10) Patent No.: US 12,461,043 B2
(45) Date of Patent: Nov. 4, 2025

(54) DIELECTRIC SPECTROSCOPY MEASURING DEVICE AND DIELECTRIC SPECTROSCOPY MEASURING METHOD

(71) Applicant: NTT, Inc., Tokyo (JP)

(72) Inventors: Masahito Nakamura, Musashino (JP); Takuro Tajima, Musashino (JP); Michiko Seyama, Musashino (JP)

(73) Assignee: NTT, Inc., Tokyo (JP)

( * ) Notice: Subject to any disclaimer, the term of this patent is extended or adjusted under 35 U.S.C. 154(b) by 101 days.

(21) Appl. No.: 18/275,556

(22) PCT Filed: Feb. 5, 2021

(86) PCT No.: PCT/JP2021/004219
§ 371 (c)(1),
(2) Date: Aug. 2, 2023

(87) PCT Pub. No.: WO2022/168250
PCT Pub. Date: Aug. 11, 2022

(65) Prior Publication Data
US 2024/0102943 A1  Mar. 28, 2024

(51) Int. Cl.
*G01N 22/00* (2006.01)
*A61B 5/0507* (2021.01)
(Continued)

(52) U.S. Cl.
CPC ........... *G01N 22/00* (2013.01); *A61B 5/0507* (2013.01); *A61B 5/0537* (2013.01); *A61B 5/145* (2013.01); *A61B 5/1495* (2013.01); *G01N 27/026* (2013.01)

(58) Field of Classification Search
CPC .... G01N 22/00; G01N 27/026; A61B 5/0537; A61B 5/0507; A61B 5/145; A61B 5/1495
(Continued)

(56) References Cited

U.S. PATENT DOCUMENTS

| | | | |
|---|---|---|---|
| 5,661,404 A | 8/1997 | Yanagawa et al. | |
| 2013/0001422 A1* | 1/2013 | Lavon | G01S 13/42 250/393 |

(Continued)

FOREIGN PATENT DOCUMENTS

| | | |
|---|---|---|
| JP | H08-043463 A | 2/1996 |
| JP | 2001-272428 A | 10/2001 |

(Continued)

OTHER PUBLICATIONS

JP 2019190895 Machine Translation, Oct. 31, 2019 (Year: 2019).*
(Continued)

*Primary Examiner* — Raul J Rios Russo

(57) ABSTRACT

A dielectric spectroscopy measuring device includes a signal generation unit that generates electromagnetic waves, a signal separation unit that separate the electromagnetic waves according to a transmission direction and outputs the separated electromagnetic waves to an output destination corresponding to the transmission direction, a changeover switch unit that receives the electromagnetic waves generated by the signal generation unit via the signal separation unit, switches an output destination, and outputs the received electromagnetic waves, and outputs electromagnetic waves returning from the output destination to the signal separation unit, a sensor unit that irradiates a measurement target with the electromagnetic waves output by the changeover switch unit, and outputs measurement target waves obtained by irradiation to the changeover switch unit, a calibration standard unit including a circuit for calibration standard, the circuit outputting reflected waves for calibration generated by receiving the electromagnetic waves output by the changeover switch unit to the changeover switch unit, a signal reception unit that receives the measurement target waves and the reflected waves for calibration via the signal separation unit, and an operation unit that receives a mea- (Continued)

surement value output by the signal reception unit receiving the measurement target waves and the reflected waves for calibration, and corrects the received measurement value of the measurement target on the basis of the measurement value corresponding to the received reflected waves for calibration.

8 Claims, 9 Drawing Sheets

(51) Int. Cl.
  *A61B 5/0537* (2021.01)
  *A61B 5/145* (2006.01)
  *A61B 5/1495* (2006.01)
  *G01N 27/02* (2006.01)
(58) Field of Classification Search
  USPC .................................................... 324/76.14
  See application file for complete search history.

(56) References Cited

U.S. PATENT DOCUMENTS

| | | | | |
|---|---|---|---|---|
| 2016/0051171 | A1* | 2/2016 | Pikov | A61B 5/0507 600/407 |
| 2018/0008925 | A1* | 1/2018 | Imada | B01D 46/442 |
| 2021/0177310 | A1 | 6/2021 | Nakamura et al. | |
| 2021/0199598 | A1* | 7/2021 | Dellis | G01N 27/02 |
| 2021/0208052 | A1* | 7/2021 | Kuznetcov | G01N 15/082 |
| 2022/0349964 | A1* | 11/2022 | Mizuochi | G01R 33/323 |

FOREIGN PATENT DOCUMENTS

| | | |
|---|---|---|
| JP | 2003-075369 A | 3/2003 |
| JP | 2005-121422 A | 5/2005 |
| JP | 2013-032933 A | 2/2013 |
| JP | 2018-096806 A | 6/2018 |
| JP | 2019-190895 A | 10/2019 |

OTHER PUBLICATIONS

JP H0843463 Machine Translation, Feb. 16, 1996 (Year: 1996).*
M. Hofmann et al., "Microwave-Based Noninvasive Concentration Measurements for Biomedical Applications", IEEE Trans. Microwave Theory and Techniques, vol. 61, No. 5, pp. 2195-2204, 2013.
J. P. Grant et al., "A critical study of the open-ended coaxial line sensor technique for RF and microwave complex permittivity measurements", J. Phys. E: Sci. Instrum, vol. 22, pp. 757-770, 1989.
T. P. Marsland et al., "Dielectric measurements with an open-ended coaxial probe", IEE Proceedings, vol. 134, No. 4, pp. 341-349, 1987.

* cited by examiner

DIELECTRIC SPECTROSCOPY MEASURING DEVICE AND DIELECTRIC SPECTROSCOPY MEASURING METHOD

CROSS-REFERENCE TO RELATED APPLICATIONS

This application is a 371 National Stage of International Application No. PCT/JP2021/004219, filed on Feb. 5, 2021. The entire disclosure of the above application is incorporated herein by reference.

TECHNICAL FIELD

The present invention relates to a dielectric spectroscopy measuring device and a dielectric spectroscopy measuring method.

BACKGROUND ART

As the population ages, dealing with adult diseases has become a major issue. Testing a blood sugar level or the like is a heavy burden on patients because blood collection is required. Therefore, a noninvasive component concentration measurement device that does not collect blood is attracting attention. As the non-invasive component concentration measurement device, a scheme in which electromagnetic waves in a microwave to millimeter wave band are used because there is less scattering in a living body and energy possessed by one photon is low as compared to an optical scheme such as near-infrared light has been proposed.

As the technique using electromagnetic waves in the microwave to millimeter wave band, for example, there is a scheme using a resonance structure disclosed in NPL 1. In this scheme, a device with a high Q value such as an antenna or resonator is brought into contact with a measurement sample and frequency characteristics around a resonance frequency are measured. The resonant frequency is determined by complex permittivity around the device. Therefore, it is possible to estimate a component concentration from a shift amount of the resonance frequency by predicting a correlation between the shift amount of the resonance frequency and the component concentration in advance.

As another scheme using electromagnetic waves in a microwave to millimeter wave band, dielectric spectroscopy disclosed in PTL 1 has been proposed. In the dielectric spectroscopy, skin is irradiated with electromagnetic waves, the electromagnetic waves are absorbed according to an interaction between a blood component that is a measurement target such as a glucose molecule and water, and an amplitude and phase of the electromagnetic waves are observed. A dielectric relaxation spectrum can be calculated from an amplitude and phase with respect to a frequency of observed electromagnetic waves. Since the dielectric relaxation spectrum is generally expressed as linear coupling of relaxation curves on the basis of a Cole-Cole equation, a complex permittivity can be calculated from the dielectric relaxation spectrum.

For example, it is known that there is a correlation between an amount of blood components such as glucose and cholesterol contained in blood, that is, a component concentration, and the complex permittivity. It is possible to measure the complex permittivity by measuring an amplitude and phase of an electrical signal that changes according to a change in the complex permittivity. Therefore, in measurement of biological components, it is possible to construct a calibration model by measuring a change in the complex permittivity and a correlation between the complex permittivity and the component concentration in advance, and to perform calibration of the component concentration from the constructed calibration model and a change in the dielectric relaxation spectrum calculated on the basis of the amplitude and phase with respect to the frequency of the electromagnetic waves.

Measurement sensitivity can be expected to be improved by selecting a frequency band that has a strong correlation with a target component regardless of which scheme is used. Therefore, it is important to measure the change in complex permittivity in advance through broadband dielectric spectroscopy. In a scheme using a coaxial probe (Open-ended coaxial probe or Open-ended coaxial line) as shown in NPL 2 and NPL 3 among dielectric spectroscopy methods, it is possible to use water or the like that is easy to obtain for calibration of a measurement instrument, and it is possible to measure a complex permittivity of a measurement sample by bringing a sample under measurement into contact with an end surface of the probe without requiring special processing of a material. Therefore, this is suitable for measurement of a sample whose electrical characteristics are desired to be evaluated without processing of a living body, fruit, soil, or the like.

CITATION LIST

Non Patent Literature

[PLT 1] Japanese Unexamined Patent Application No. 2013-032933
Non-Patent Literature
[NPL 1] M. Hofmann, G, Fischer, R, Weigel, and D, Kissinger, "Microwave-Based Noninvasive Concentration Measurements for Biomedical Applications," IEEE Trans. Microwave Theory and Techniques, Vol. 61, No. 5, pp. 2195-2204, 2013
[NPL 2] J P. Grant, R N. Clarke, G T. Symm and N M. Spyrou, "A critical study of the open-ended coaxial line sensor technique for RF and microwave complex permittivity measurements," J. Phys. E: Sci. Instrum, Vol. 22, pp. 757-770, 1989
[NPL 3] T. P. Marsland, and S, Evans, "Dielectric measurements with an open-ended coaxial probe," IEE Proceedings, Vol. 134, No. 4, pp. 341-349, 1987

SUMMARY OF INVENTION

Technical Problem

For example, in order to perform measurement using the coaxial probe on a person who needs to continuously test a blood sugar level or the like, it is considered desirable to adopt, for example, a small sensor terminal device such as a wearable device as a device configuration and cause the person to the wear the sensor terminal device. On the other hand, a device configuration that performs measurement using a coaxial probe of the related art is, for example, a device configuration in which a coaxial probe 101 and a general-purpose measurement device 103 that generates or detects microwaves are connected by a high-frequency cable 102, as illustrated in FIG. 11. Considering a size or weight of the general-purpose measurement device 103, it can be said that the device configuration of the related art is not suitable for the above-described use of being worn by a person.

In order to make a small sensor terminal device that can be attached to a living body, for example, it is conceivable to configure a measurement instrument 210 by integrally integrating a coaxial probe 214, a signal generation unit 212 that generates microwaves, a signal reception unit 215 that receives microwaves, transmission lines 221 to 223, and a signal separation unit 213 such as a directional coupler on a printed circuit board 211, as illustrated in FIG. 12, using a discrete integrated circuit (IC) or a monolithic microwave integrated circuit (MMIC).

However, in the case of such a measurement instrument 210, a change in electrical characteristics of the printed circuit board 211 due to heat generated at the time of an operation for a long period of time, a signal change due to a change in a microwave oscillation mode of the signal generation unit 212, or the like may be superimposed as an error on measurement results and cause drift. Therefore, there is a problem that it is difficult to continuously measure a measurement target with high accuracy.

In view of the above circumstances, an object of the present invention is to provide a technology for enabling improvement of measurement accuracy by reducing an influence of drift when a dielectric spectrometer is created by using a circuit board and a measurement target is measured.

Solution to Problem

One aspect of the present invention is a dielectric spectroscopy measuring device including: a signal generation unit configured to generate electromagnetic waves; a signal separation unit configured to separate the electromagnetic waves according to a transmission direction and output the separated electromagnetic waves to an output destination corresponding to the transmission direction; a changeover switch unit configured to receive the electromagnetic waves generated by the signal generation unit via the signal separation unit, switch an output destination, and output the received electromagnetic waves, and to output electromagnetic waves returning from the output destination to the signal separation unit; a sensor unit configured to irradiate a measurement target with the electromagnetic waves output by the changeover switch unit, and output measurement target waves obtained by irradiation to the changeover switch unit;

a calibration standard unit including a circuit for a calibration standard, the circuit outputting reflected waves for calibration generated by receiving the electromagnetic waves output by the changeover switch unit to the changeover switch unit; a signal reception unit configured to receive the measurement target waves and the reflected waves for calibration via the signal separation unit; and an operation unit configured to receive a measurement value output by the signal reception unit receiving the measurement target waves and the reflected waves for calibration, and correct the received measurement value of the measurement target on the basis of the measurement value corresponding to the received reflected waves for calibration, wherein the signal generation unit, the signal reception unit, the changeover switch unit, the sensor unit, and the signal separation unit are formed on one circuit board as a dielectric spectrometer.

One aspect of the present invention is a dielectric spectroscopy measuring method performed by a dielectric spectroscopy measuring device in which a signal generation unit, a signal reception unit, a changeover switch unit, a sensor unit, and a signal separation unit are formed as a dielectric spectrometer on one circuit board, the dielectric spectroscopy measurement method including: generating, by the signal generation unit, electromagnetic waves; receiving, by the signal separation unit, the electromagnetic waves generated by the signal generation unit, and outputting the received electromagnetic waves to the changeover switch unit; receiving, by the changeover switch unit, the electromagnetic waves generated by the signal generation unit via the signal separation unit, switching an output destination, and outputting the received electromagnetic waves; outputting, by a circuit for a calibration standard, reflected waves for calibration generated by receiving the electromagnetic waves output by the changeover switch unit to the changeover switch unit; outputting, by the changeover switch unit, the reflected waves for calibration returning from the output destination to the signal separation unit; irradiating, by the sensor unit, a measurement target with the electromagnetic waves output by the changeover switch unit, and outputting measurement target waves obtained by the irradiation to the changeover switch unit; outputting, by the changeover switch unit, the measurement target waves returning from the output destination to the signal separation unit; outputting, by the signal separation unit, the measurement target waves and the reflected waves for calibration to the signal reception unit; receiving, by the signal reception unit, the measurement target waves and the reflected waves for calibration; and receiving, by an operation unit, a measurement value output by the signal reception unit receiving the measurement target waves and the reflected waves for calibration, and correcting the received measurement value of the measurement target on the basis of the measurement value corresponding to the received reflected waves for calibration.

Advantageous Effects of Invention

According to the present invention, it is possible to improve measurement accuracy by reducing an influence of drift when a dielectric spectrometer is created by using a circuit board and a measurement target is measured.

DESCRIPTION OF EMBODIMENTS

Hereinafter, embodiments of the present invention will be described with reference to the drawings.

Figure 1:
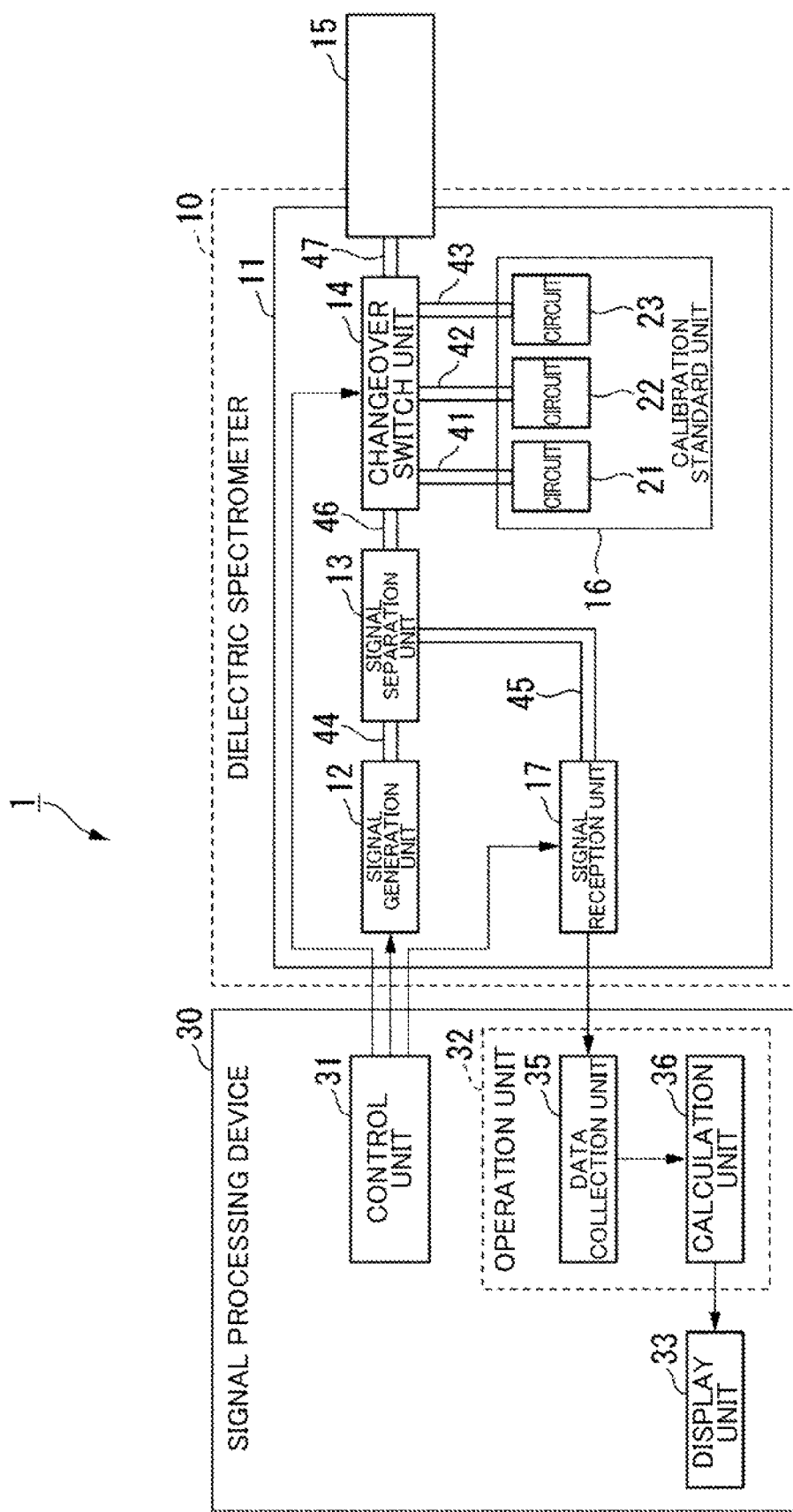
FIG. 1 is a block diagram illustrating a configuration of a dielectric spectroscopy measuring device according to an embodiment of the present invention.

FIG. 1 is a block diagram illustrating a configuration of a dielectric spectroscopy measuring device 1 according to an embodiment of the present invention. The dielectric spectroscopy measuring device 1 includes a dielectric spectrometer 10 and a signal processing device 30. The dielectric spectrometer 10 includes a circuit board 11, a signal generation unit (signal generator) 12, a signal separation unit (signal separator) 13, a changeover switch unit (changeover switch) 14, a sensor unit (sensor) 15, a calibration standard unit (calibration standard) 16, a signal reception unit (signal receiver) 17, and transmission lines 41 to 47. In the circuit board 11, the signal generation unit 12, the signal separation unit 13, the changeover switch unit 14, the sensor unit 15, the calibration standard unit 16, the signal reception unit 17, and the transmission lines 41 to 47 are integrated and formed.

As the circuit board 11, for example, a printed board, a ceramic board, a semiconductor circuit board, or the like is applied. The signal generation unit 12 is an electromagnetic waves oscillator and, for example, a solid oscillator such as a voltage-controlled oscillator (VCO), a phased locked loop (PLL), a Gunn diode, a tunnel diode, or a dielectric resonator is applied. The signal generation unit 12 generates electromagnetic waves such as microwaves or millimeter waves. The signal reception unit 17 is a receiver that receives electromagnetic waves such as microwaves or millimeter waves. For the signal reception unit 17, a Schottky barrier diode, an IQ (In-Phase, Quadrature-Phase) mixer, or the like, for example, is applied.

The signal separation unit 13 is, for example, a directional coupler or a circulator. The signal separation unit 13 is connected to the signal generation unit 12 via the transmission line 44, connected to the signal reception unit 17 via the transmission line 45, and connected to the changeover switch unit 14 via the transmission line 46. The signal separation unit 13 separates the electromagnetic waves received from the transmission lines 44 and 46 according to a transmission direction, and outputs the separated electromagnetic waves to an output destination corresponding to the transmission direction 46. More specifically, when the signal separation unit 13 receives the electromagnetic waves propagating through the transmission line 44, the signal separation unit 13 does not output the received electromagnetic waves to the transmission line 45, but outputs the received electromagnetic waves only to the transmission line. When the signal separation unit 13 receives the electromagnetic waves propagating through the transmission line 46, does not output the received electromagnetic waves to the transmission line 44, but outputs the received electromagnetic waves only to the transmission line 45.

The changeover switch unit 14 is a one-input four-output switch that switches among output destinations of electromagnetic waves. A semiconductor type switch or a micro electro mechanical systems (MEMS) type switch, for example, is applied for the changeover switch unit 14. The changeover switch unit 14 performs switching from the transmission line 46 to any one of the transmission lines 41, 42, and 43, and 47 and connects the transmission line 46 to the one transmission line, thereby switching the output destination of the electromagnetic waves generated by the signal generation unit 12, which propagate through the transmission line 46, and outputs electromagnetic waves returning from the output destination to the transmission line 46.

The sensor unit 15 is, for example, a reflective sensor such as a coaxial probe, and is used by being brought into contact with a measurement target. The sensor unit 15 is connected to the changeover switch unit 14 via the transmission line 47 and receives the electromagnetic waves generated and output by the signal generation unit 12 through the signal separation unit 13 and the changeover switch unit 14. The sensor unit 15 irradiates a material under measurement, which is the measurement target, with the received electromagnetic waves. Here, the material under measurement, which is the measurement target, is a gas, liquid, or solid sample, and is, for example, a material such as a living body, fruit, wood, or stone, soil, water, aqueous solution, air, and the like. The sensor unit 15 receives either reflected waves reflected by the material under measurement receiving the radiated electromagnetic waves or transmitted waves after the radiated electromagnetic waves has transmitted through the material under measurement when there are either waves, or both the reflected waves and the transmitted waves when there are both as measurement target waves. The sensor unit 15 may be, for example, an antenna designed according to use of the dielectric spectroscopy measuring device 1, a split-ring resonator (SRR), or the like, as well as a coaxial sensor such as the coaxial probe described above.

Figure 2:
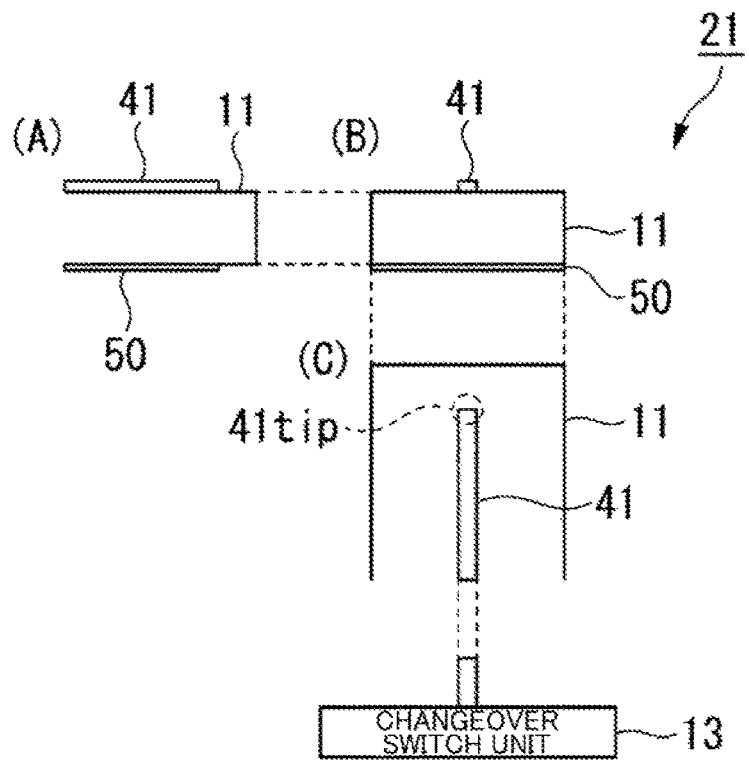
FIG. 2 is a block diagram illustrating a configuration of an open circuit included in a calibration standard unit of the dielectric spectroscopy measuring device according to the embodiment of the present invention.
Figure 3:
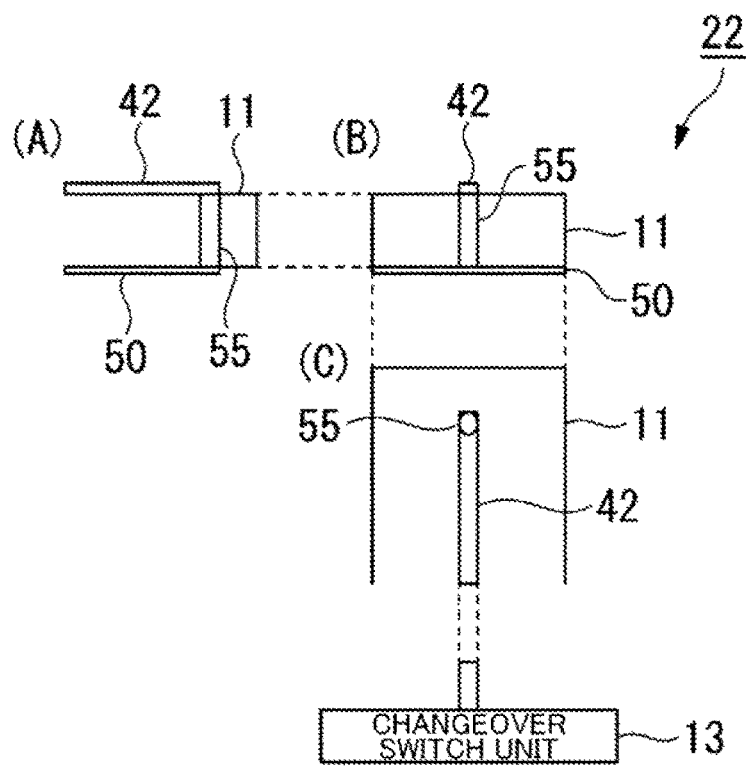
FIG. 3 is a block diagram illustrating a configuration of a short circuit included in a calibration standard unit of the dielectric spectroscopy measuring device according to the embodiment of the present invention.
Figure 4:
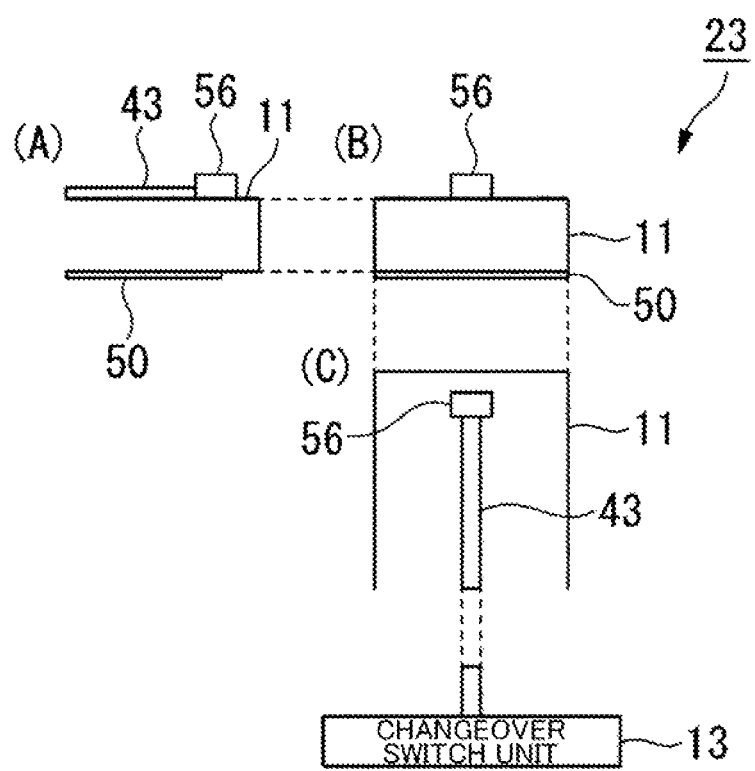
FIG. 4 is a block diagram illustrating a configuration of a termination circuit included in the calibration standard unit of the dielectric spectroscopy measuring device according to the embodiment of the present invention.

The calibration standard unit 16 includes circuits 21, 22, and 23 for calibration standard that detect characteristics of the circuit board 11 at a measurement time. The circuits 21, 22, and 23 for calibration standard are circuits formed at the ends of the transmission lines 41, 42, and 43 connected to the respective circuits 21, 22, and 23, and are three types of electrical circuits including an open circuit, a short circuit, and a termination circuit. Hereinafter, detailed configurations of the circuits 21, 22, and 23 will be described with reference to FIGS. 2 to 4. In (A), (B), and (C) of FIGS. 2 to 4 are a side view, a front view, and a plan view, respectively, and in FIGS. 2 to 4, the same components as in FIG. 1 are denoted by the same reference signs. In FIGS. 2 to 4, a portion denoted by reference sign 50 is a ground electrode on the back surface of the circuit board 11.

FIG. 2 is a diagram illustrating a configuration of the circuit 21, which is an open circuit. The circuit 21 is a circuit in which the tip of the transmission line 41 indicated by reference sign 41 tip in FIG. 2(C) is in an open state. Since the circuit 21 is in an open state, when electromagnetic waves arrive at the tip of the transmission line 41, reflection with a reflection coefficient of "1" occurs, and the same electromagnetic waves as the arriving electromagnetic waves propagate through the transmission line 41 in an opposite direction, that is, a direction of the changeover switch unit 14.

FIG. 3 is a diagram illustrating a configuration of the circuit 22, which is a short circuit. As illustrated in FIGS. 3(A) to 3(C), a circuit in a short-circuited state is formed by a tip of the transmission line 42 being connected to a ground electrode 50 of the circuit board 11 through a pier 55 that conducts electricity. Since the circuit 22 is in a short-circuited state, when the electromagnetic waves arrive at the tip of the transmission line 42, reflection with a reflection coefficient of "−1" occurs, and electromagnetic waves having a voltage sign opposite to the arriving electromagnetic waves propagate through the transmission line 42 in an opposite direction, that is, in a direction of the changeover switch unit 14.

FIG. 4 is a diagram illustrating a configuration of the circuit 23, which is a termination circuit. As illustrated in FIGS. 4(A) to 4(C), a chip-type resistance element 56 is connected to the tip of the transmission line 43 to form a circuit in a terminated state. A resistance value of the chip resistance element 56 is determined in advance to be the same as a characteristic impedance when the transmission line 46 is connected to the transmission line 43. Since the resistance value of the chip-type resistive element 56 is the same as the characteristic impedance when the transmission line 46 is connected to the transmission line 43, when electromagnetic waves arrive at the tip of the transmission line 43, reflection with a reflection coefficient of "0", that is, reflection does not occur.

Hereinafter, the reflected waves generated by reflection by the circuits 21 and 22 are referred to as reflected waves for calibration in order to distinguish them from measurement target waves, which are the electromagnetic waves received by the sensor unit 15 and output to the transmission line 47. Although no reflection occurs in the circuit 23, it is assumed for convenience of explanation that the circuit 23 generates reflected waves with a voltage value and a current value of "0" due to reflection, and reflected waves are referred to as reflected waves for calibration as in the cases of the circuits 21 and 22.

The transmission lines 41 to 47 are lines for transmitting electromagnetic waves and, for example, a microstrip line (MSL), a coplanar waveguide (CPW), a grounded coplanar waveguide (GCPW), and a coplanar strip (CPS) are applied.

When a frequency of the measurement target in the electromagnetic waves or a center frequency in a frequency band of the measurement target is determined in advance, and transmission line lengths of the transmission lines 41, 42, and 43 connecting the changeover switch unit 14 to the calibration standard unit 16 and a transmission line length of the transmission line 47 connecting the changeover switch unit 14 to the sensor unit 15 are designed, the transmission line length may be set to a length shown in Equation (1) below so that an influence of reflected waves caused by the transmission line lengths of the transmission lines 41, 42, 43, and 47 is reduced.

[Math. 1]

$$L = \frac{n\lambda_e}{4} \quad (1)$$

In Equation (1) above, L is the transmission line length, $\lambda_e$ is an effective wavelength of the electromagnetic waves, and is a reciprocal of the frequency of the measurement target or the center frequency in the frequency band of the measurement target. In Equation (1), n is an integer greater than or equal to 1 and is arbitrarily determined.

The signal processing device 30 includes a control unit 31, an operation unit (operator) 32, and a display unit 33. The control unit 31 is connected to each of the signal generation unit 12, the changeover switch unit 14, and the signal reception unit 17 via control lines that transmit electrical signals. The control unit 31 outputs, to the signal generation unit 12, a generation start instruction signal for instructing to start generation of electromagnetic waves and a generation end instruction signal for instructing to end the generation of electromagnetic waves. The control unit 31 outputs a switching instruction signal for instructing the changeover switch unit 14 to switch a connection destination of the transmission line 46 to any one of the transmission lines 41, 42, and 43, and 47. The control unit 31 outputs, to the signal reception unit 17, a reception start instruction signal for instructing to start reception of the electromagnetic waves and a reception end instruction signal for instructing to end the reception of the electromagnetic waves.

The operation unit 32 includes a data collection unit 35 and a calculation unit 36. The data collection unit 35 is connected to the signal reception unit 17 via a control line that transmits an electrical signal. The data collection unit 35 receives a measurement value of the electrical signal output by the signal reception unit 17 receiving the measurement target waves from the sensor unit 15 and the reflected waves for calibration from each of the circuits 21, 22, and 23 of the calibration standard unit 16.

The calculation unit 36 performs a so-called Open/Short/Load (OSL) calibration on the basis of the measurement value corresponding to the reflected waves for calibration corresponding to each of the circuits 21, 22, and 23 received by the data collection unit 35, and known true values corresponding to each of the circuits 21, 22, and 231, to correct the measurement value of the material under measurement that is received by the data collection unit 35, and performs an operation for calculating the true value of the material under measurement. Here, the true value corresponding to the respective circuits 21, 22, and 23 are reflection coefficients "1", "−1" and "0" of the respective circuits 21, 22, and 23 described above. The calculation unit 36 stores true values corresponding to the respective circuits 21, 22, and 23 in an internal storage area in advance. The display unit 33 displays the corrected measurement value of the material under measurement calculated by the calculation unit 36.

The signal processing device 30 is configured by, for example, a personal computer or a microcomputer, and for the calculation unit 36 of the operation unit 32, for example, a high-resolution analog digital converter (ADC), a field programmable gate array (FPGA), a digital signal processor (DSP), and the like are used together appropriately, and the calculation unit 36 is configured so that accuracy or calculation speed suitable for use can be obtained.

(Processing in Dielectric Spectrometer)

Figure 5:
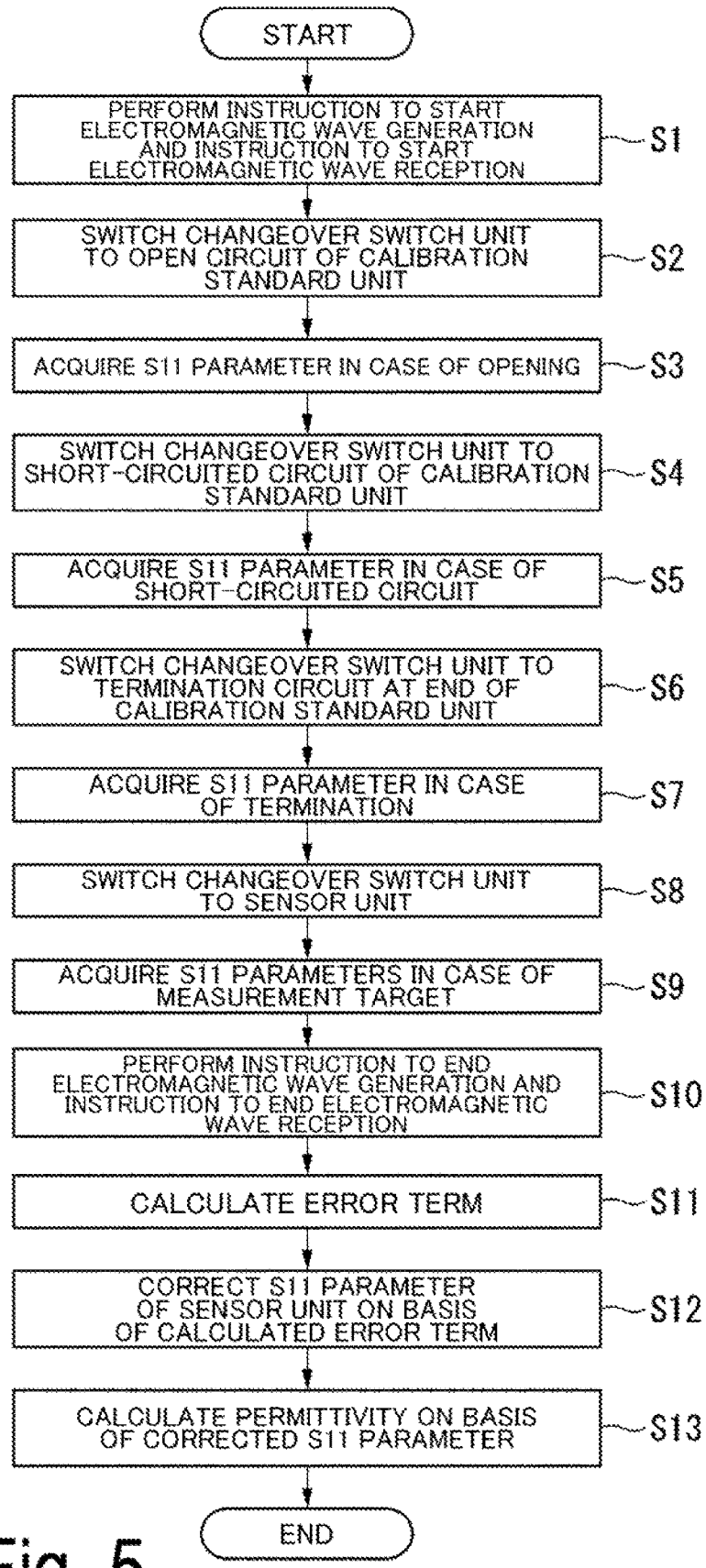
FIG. 5 is a flow chart illustrating a flow of processing in the dielectric spectroscopy measuring device according to the embodiment of the present invention.

FIG. 5 is a flow chart illustrating a flow of processing in the dielectric spectroscopy measuring device 1. It is assumed that the sensor unit 15 is brought into contact with the material under measurement that is the measurement target in advance. The control unit 31 includes a timer means such as a clock therein, and when a time indicated by the timer means arrive at a predetermined measurement time, the control unit 31 outputs the generation start instruction signal to the signal generation unit 12 and the reception start instruction signal to the signal reception unit 17. When the signal generation unit 12 receives the generation start instruction signal from the control unit 31, the signal generation unit 12 generates electromagnetic waves and outputs the electromagnetic waves to the transmission line 44. When the signal reception unit 17 receives the reception start instruction signal from the control unit 31, the signal reception unit 17 starts reception of the electromagnetic waves from the transmission line 45 (step S1).

After the control unit 31 outputs the generation start instruction signal and the reception start instruction signal, the control unit 31 outputs a switching instruction signal for connecting the transmission line 46 to the circuit 21 of the calibration standard unit 16 to the changeover switch unit 14. When the changeover switch unit 14 receives the switching instruction signal for connecting the transmission line 46 to the circuit 21 of the calibration standard unit 16 from the control unit 31, the changeover switch unit 14 performs switching of the connection destination of the transmission line 46 to connect the transmission line 46 to the transmission line 41 (step S2).

The electromagnetic waves generated by the signal generation unit 12 and output to the transmission line 44 propagate through the transmission line 44 and arrive at the signal separation unit 13. The signal separation unit 13 receives the arriving electromagnetic waves and outputs the received electromagnetic waves to the transmission line 46. The electromagnetic waves propagating through the transmission line 46 propagate through the transmission line 41 via the changeover switch unit 14. Since the circuit 21 is a circuit in an open state, the electromagnetic waves are reflected at the tip of the transmission line 41 with a reflection coefficient of "1", and the reflected waves for calibration that are reflected electromagnetic waves propagate through the transmission line 41 in the opposite direction.

The reflected waves for calibration propagating through the transmission line 41 propagate through the transmission line 46 via the changeover switch unit 14 and arrive at the signal separation unit 13. The signal separation unit 13 receives the arriving reflected waves for calibration, and outputs the received reflected waves for calibration to the transmission line 45. The reflected waves for calibration propagate through the transmission line 45 and arrive at the signal reception unit 17.

The signal reception unit 17 receives the arriving reflected waves for calibration, and converts the received reflected waves for calibration into a measurement value of an electrical signal. This measurement value indicates an S11 parameter among S parameters. The signal reception unit 17 outputs the converted measurement value to the data collection unit 35. The data collection unit 35 receives the measurement value output by the signal reception unit 17 (step S3). Accordingly, the data collection unit 35 acquires the measurement value corresponding to the circuit 21, that is, the S11 parameter in the case of the circuit 21.

After the control unit 31 outputs the switching instruction signal for connecting the transmission line 46 to the circuit 21 of the calibration standard unit 16 and when a predetermined time elapses, the control unit 31 outputs a switching instruction signal for connecting the transmission line 46 to the circuit 22 of the calibration standard unit 16 to the changeover switch unit 14. When the changeover switch unit 14 receives the switching instruction signal for connecting the transmission line 46 to the circuit 22 of the calibration standard unit 16 from the control unit 31, the changeover switch unit 14 performs switching of the connection destination of the transmission line 46 and connects the transmission line 46 to the transmission line 42 (step S4).

The electromagnetic waves generated by the signal generation unit 12 and output to the transmission line 44 propagate through the transmission line 44 and arrive at the signal separation unit 13. The signal separation unit 13 receives the arriving electromagnetic waves and outputs the received electromagnetic waves to the transmission line 46. The electromagnetic waves propagating through the transmission line 46 propagate through the transmission line 42 via the changeover switch unit 14. Since the circuit 21 is a circuit in short-circuited state, the electromagnetic waves are reflected at the tip of the transmission line 42 with a reflection coefficient of "−1", and the reflected waves for calibration that are reflected electromagnetic waves propagate through the transmission line 42 in the opposite direction.

The reflected waves for calibration propagating through the transmission line 42 propagate through the transmission line 46 via the changeover switch unit 14 and arrive at the signal separation unit 13. After the reflected waves arrive at the signal separation unit 13, the processing is the same as in step S3 (step S5). Accordingly, the data collection unit 35 acquires the measurement value corresponding to the circuit 22, that is, the S11 parameter in the case of the circuit 22.

The control unit 31 outputs a switching instruction signal for connecting the transmission line 46 to the circuit 23 of the calibration standard unit 16 to the changeover switch unit 14 when a predetermined time has elapsed after the control unit 31 outputs the switching instruction signal for connecting the transmission line 46 to the circuit 22 of the calibration standard unit 16. When the changeover switch unit 14 receives the switching instruction signal for connecting the transmission line 46 to the circuit 23 of the calibration standard unit 16 from the control unit 31, the changeover switch unit 14 performs switching of the connection destination of the transmission line 46 and connects the transmission line 46 to the transmission line 43 (step S6).

The electromagnetic waves generated by the signal generation unit 12 and output to the transmission line 44 propagate through the transmission line 44 and arrive at the signal separation unit 13. The signal separation unit 13 receives the arriving electromagnetic waves and outputs the received electromagnetic waves to the transmission line 46. The electromagnetic waves propagating through the transmission line 46 propagate through the transmission line 43 via the changeover switch unit 14. Since the circuit 23 is a circuit in a terminated state, the electromagnetic waves are reflected at the tip of the transmission line 43 with a reflection coefficient of "0", and the reflected waves for calibration that are the reflected electromagnetic waves propagate through the transmission line 43 in an opposite direction.

The reflected waves for calibration propagating through the transmission line 43 propagate through the transmission line 46 via the changeover switch unit 14 and arrive at the signal separation unit 13. After the reflected waves for calibration arrive at the signal separation unit 13, the processing is the same as in step S3 (step S7). Accordingly, the data collection unit 35 acquires the measurement value corresponding to the circuit 23, that is, the S11 parameter for the circuit 23.

After the control unit 31 outputs the switching instruction signal for connection to the circuit 23 of the calibration standard unit 16, the control unit 31 outputs a switching instruction signal for connecting the transmission line 46 to the sensor unit 15 to the changeover switch unit 14 when a predetermined time has elapsed. When the changeover switch unit 14 receives the switching instruction signal for connecting the transmission line 46 to the sensor unit 15 from the control unit 31, the changeover switch unit 14 performs switching of the connection destination of the transmission line 46 and connects the transmission line 46 to the transmission line 47 (step S8).

The electromagnetic waves generated by the signal generation unit 12 and output to the transmission line 44 propagate through the transmission line 44 and arrive at the signal separation unit 13. The signal separation unit 13 receives the arriving electromagnetic waves and outputs the received electromagnetic waves to the transmission line 46. The electromagnetic waves propagating through the transmission line 46 propagate through the transmission line 47 via the changeover switch unit 14 and arrive at the sensor unit 15. The sensor unit 15 receives the arriving electromagnetic waves, and irradiates the material under measurement in contact with the sensor unit 15 with the received electromagnetic waves.

The sensor unit 15 receives either reflected waves reflected by the material under measurement receiving the radiated electromagnetic waves or transmitted waves after the radiated electromagnetic waves has transmitted through the material under measurement when there are either waves, or both the reflected waves and the transmitted waves when there are both as measurement target waves. The sensor unit 15 outputs the received measurement target waves to the transmission line 47. The measurement target waves propagating through the transmission line 47 propagate through the transmission line 46 via the changeover switch unit 14 and arrive at the signal separation unit 13. The signal separation unit 13 receives the arriving measurement target waves, and outputs the received measurement target waves to the transmission line 45. The measurement target waves propagate through the transmission line 45 and arrive at the signal reception unit 17.

The signal reception unit 17 receives the arriving measurement target waves, and converts the received measurement target waves into a measurement value of an electrical signal. The signal reception unit 17 outputs the converted measurement value to the data collection unit 35. The data collection unit 35 acquires the measurement value output by the signal reception unit 17 (step S9). Accordingly, the data collection unit 35 acquires the measurement value corresponding to the measurement target, that is, the S11 parameter in the case of the measurement target.

After the control unit 31 outputs the switching instruction signal for connection to the sensor unit 15, the control unit 31 outputs the generation end instruction signal to the signal generation unit 12 and the reception end instruction signal to the signal reception unit 17 when a predetermined time has elapsed. When the signal generation unit 12 receives the generation end instruction signal from the control unit 31, the signal generation unit 12 ends generation of electromagnetic waves. When the signal reception unit 17 receives the reception end instruction signal from the control unit 31, the signal reception unit 17 ends reception of the electromagnetic waves from the transmission line 45 (step S10).

In steps S4, S6, S8, and S10 described above, a length of the predetermined time that is a timing at which the control unit 31 starts processing is a length equal to or larger than a time required for the data collection unit 35 to acquire a new measurement value after the switching instruction signal is output, and a length sufficient for the data collection unit 35 to reliably acquire a new measurement value is determined in advance. The control unit 31 includes, for example, a timer in which the predetermined time is set therein, starts the timer when outputting the switching instruction signal, and starts the next processing when the timer expires.

The data collection unit 35 outputs the acquired S11 parameter in the case of the circuit 21, S11 parameter in the case of the circuit 22, S11 parameter in the case of the circuit 23, and S11 parameter in the case of the measurement target to the calculation unit 36. The data collection unit 35, for example, may assign identification information to each of the SHI parameters so that the calculation unit 36 can specify in which case is the S11 parameter, and may output the S11 parameters to the calculation unit 36 in predetermined order. The calculation unit 36 receives the S11 parameter in the case of each of the circuits 21, 22, and 23 and the measurement target output by the data collection unit 35.

The calculation unit 36 calculates a measurement error caused by a change in electrical characteristics due to temperature of the circuit board 11, a signal change caused by a change in oscillation mode of the signal generation unit 12, or the like on the basis of the true value corresponding to each of the circuits 21, 22, and 23 stored in the internal storage area and the received S11 parameter in the case of each of the circuits 21, 22, and 23.

Figure 6:
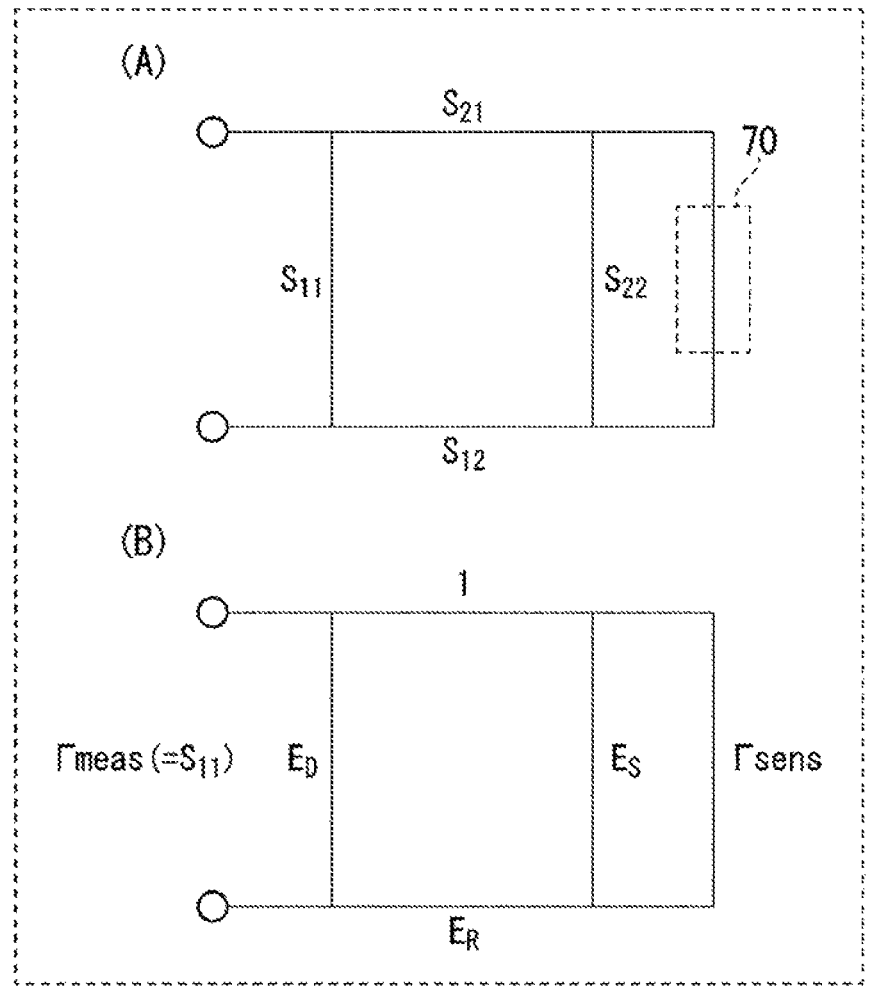
FIG. 6 is a diagram illustrating S-parameters and an error-term model in the case of one-port measurement.

Here, the measurement error that occurs in the case of one-port measurement will be described with reference to FIG. 6. FIG. 6(A) is a diagram illustrating S-parameters in the case of one-port measurement, and reference sign 70 indicates a position of the material under measurement that is a measurement target or the circuits 21, 22, and 23 for calibration standard. FIG. 6(B) is a diagram illustrating factors of the measurement error in the case of the one-port measurement notated by an error-term model. In FIG. 6(B), $\Gamma_{means}$ is the measurement value, that is, a reflection coefficient obtained by measurement, which is the S11 parameter received by the calculation unit 36. In FIG. 6(B), $\Gamma_{sens}$ is a true value of the reflection coefficient, and $E_D$, $E_S$, and $E_R$ are error terms that are factors of the measurement error.

As illustrated in a reference below, a relationship between $\Gamma_{means}$ and $\Gamma_{sens}$ can be expressed as Equation (2) below using $E_D$, $E_S$, and $E_R$.

[Reference: Andrej Rumiantsev, N. M. Ridler, "VNA Calibration," IEEE Microwave Magazine, IEEE Xplore, Volume 9, No. 3, pp 86-99, June 2008]

[Math. 2]]

$$\Gamma_{sens} = \frac{\Gamma_{means} - E_D}{E_S(\Gamma_{means} - E_D) + E_R} \quad (2)$$

For example, $\Gamma_{means}$(open) is the S11 parameter in the case of circuit 21 and $\Gamma_{sens}$(open) is true value corresponding to circuit 21, that is, "1". $\Gamma_{means}$(short circuit) is the S11 parameter in the case of the circuit 22, and $\Gamma_{sens}$(short circuit) is a true value corresponding to the circuit 22, that is, "−1". $\Gamma_{means}$(termination) is the S11 parameter in the case of circuit 23 and $\Gamma_{sens}$(termination) is a true value corresponding to the circuit 23, that is, "0".

The calculation unit 36 calculates $E_D$, $E_S$, and $E_R$ on the basis of three equations obtained by applying Equation (2) to each of a combination of $\Gamma_{means}$(open) and $\Gamma_{sens}$(open), a combination of $\Gamma_{means}$(short circuit) and $\Gamma_{sens}$(short circuit), and a combination of $\Gamma_{means}$(termination) and $\Gamma_{sens}$(termination) (step S11)

The calculation unit 36 corrects the S11 parameter in the case of the measurement target by setting the received S11 parameter of the measurement target to $\Gamma_{means}$(measurement target) and substituting $\Gamma_{means}$(measurement target) and the calculated $E_D$, $E_S$, and $E_R$ into Equation (2) and calculating the true value of the case of the measurement target, that is, the true value $\Gamma_{sens}$ of the reflection coefficient of the material under measurement (step S12).

The error term model illustrated in FIG. 6(B) is a model of error terms existing on the same transmission line. Therefore, when the connection destination of the transmission line 46 is switched by the changeover switch unit 14, an error is likely to occur in $E_D$, $E_S$, and $E_R$, due to a difference in transmission loss or phase difference for each connection destination caused by a difference in the path length inside the changeover switch unit 14, and a difference in transmission loss or phase difference caused by a difference in transmission line length between each of the transmission lines 41 to 43 leading to the respective circuits 21 to 23 and the transmission line 47 leading to the sensor unit 15.

In order to remove this error, the error generated in the case of each of the circuits 21, 22, and 23 is calculated as data in advance and stored in the internal storage area of the calculation unit 36. Data indicating an error occurring in the case of each of the circuits 21, 22, and 23 may be calculated by simulation or obtained by the following means. For example, the sensor unit 15 is removed from the transmission line 47, replaced instead with each of the circuits 21, 22, and 23, and connected to the transmission line 47, and measurement is performed. A difference between the measurement value when the circuit 21 is connected to the transmission line 47 and a measurement value when the circuit 21 is connected to the transmission line 41, a difference between a measurement value when the circuit 22 is connected to the transmission line 47 and a measurement value when the circuit 22 is connected to the transmission line 42, and a difference between the measurement value when the circuit 23 is connected to the transmission line 47 and the measurement value when the circuit 23 is connected to the transmission line 43 may be calculated, and each of the calculated differences may be used as data indicating an error occurring in each of the circuits 21, 22, and 23.

When the calculation in step S12 is performed, the calculation unit 36 calculates the true value $\Gamma_{sens}$ of the reflection coefficient of the material under measurement while correcting the error on the basis of the data indicating the error occurring in each of the circuits 21, 22, and 23 stored in the internal storage area. This makes it possible for the calculation unit 36 to calculate the true value $\Gamma_{sens}$ of the reflection coefficient of the material under measurement with higher accuracy.

The calculation unit 36 calculates the complex permittivity of the material under measurement using, for example, a coaxial probe method, on the basis of the true value Tens of the reflection coefficient of the material under measurement calculated through the correction processing in step S12. The calculation unit 36 outputs the calculated complex permittivity of the material under measurement to the display unit 33 so that the complex permittivity is displayed (step S13), and ends the processing.

For example, when a coaxial probe that is a coaxial sensor, is applied as the sensor unit 15, it is possible to calculate the complex permittivity of the material under measurement on the basis of Equations (3) and (4) below.

[Math. 3]

$$\frac{(\rho_m - \rho_1)(\rho_3 - \rho_2)}{(\rho_m - \rho_2)(\rho_1 - \rho_3)} = \frac{(y_m - y_1)(y_3 - y_2)}{(y_m - y_2)(y_1 - y_3)} \quad (3)$$

[Math. 4]

$$y_i = \varepsilon_i + \frac{G_0}{j\omega C_0}\varepsilon_i^{5/2} \quad (4)$$

In Equation (3), when a suffix of ρ ranges from 1 to 3, $\rho_1$, $\rho_2$, and $\rho_3$ are the true values of the reflection coefficients in the case of the circuits 21, 22, and 23, that is, "1" and "−1", and "0", respectively, $\rho_m$ is the true value of the reflection coefficient of the material under measurement calculated by the calculation unit 36.

A subscript i in Equation (4) is i=1, 2, 3, and m. In Equations (3) and (4), when a suffix of y ranges from 1 to 3, that is, $y_1$, $y_2$, and $y_3$ are linear maps of admittances in the case of circuits 21, 22 and 23, respectively, $y_m$ is a linear map of the admittance of the material under measurement. In Equation (4), when a suffix of ε ranges from 1 to 3, that is, $\varepsilon_1$, $\varepsilon_2$, and $\varepsilon_3$ are complex permittivity for the case of the circuits 21, 22, and 23, respectively. $\varepsilon_m$ is the complex permittivity of the material under measurement. $G_0$ is a conductance of the sensor unit 15 in vacuum, $C_0$ is a capacitance of the sensor unit 15 in vacuum, and ω is $2\pi/\lambda_e$. $\lambda_e$ is an execution wavelength that is a reciprocal of a measurement frequency in the electromagnetic waves or a center frequency in a measurement frequency band, as described in Equation (1).

When the coaxial probe is applied to the sensor unit 15, the radiation from the end face of the coaxial probe is smaller than the capacitive component of the end face of the coaxial probe and thus, $\omega C_0 >> G_0$. Therefore, $G_0/j\omega C_0$ of a second term on the right side of Equation (4) can be approximated to zero. In the case of the circuit 22, $y_2$ can be approximated to infinity because of being in a short-circuited state. Accordingly, Equations (3) and (4) can be transformed into Equations (5), (6) and (7) below.

[Math. 5]

$$y_m = -\left(\frac{\Delta_{m\_1}\Delta_{3\_2}}{\Delta_{m\_2}\Delta_{1\_3}}y_3 + \frac{\Delta_{m\_3}\Delta_{2\_1}}{\Delta_{m\_2}\Delta_{1\_3}}y_1\right) \quad (5)$$

[Math. 6]

$$y_i = \begin{cases} \varepsilon_i & (i = 1,3,m) \\ \infty & (i = 2) \end{cases} \quad (6)$$

[Math. 7]

$$\Delta_{i\_j} = \rho_i - \rho_j \quad (7)$$

By substituting Equation (6) into Equation (5), Equation (8) below is derived.

[Math. 8]

$$\varepsilon_m = -\left(\frac{\Delta_{m\_1}\Delta_{3\_2}}{\Delta_{m\_2}\Delta_{1\_3}}\varepsilon_1 + \frac{\Delta_{m\_3}\Delta_{2\_1}}{\Delta_{m\_2}\Delta_{1\_3}}\varepsilon_1\right) \quad (8)$$

Since the complex permittivity $\varepsilon_1$ corresponding to the circuit 21 and the complex permittivity $\varepsilon_3$ corresponding to the circuit 23 are known, the calculation unit 36 can calculate the complex permittivity $\varepsilon_m$ of the material under measurement by substituting $\rho_1$, $\rho_2$, $\rho_3$, and $\rho_m$ into Equation (8).

In the dielectric spectroscopy measuring device 1 of the above embodiment, the signal generation unit 12 generates electromagnetic waves. The signal separation unit 13 separates the electromagnetic waves according to the transmission direction, and outputs the separated electromagnetic waves to an output destination corresponding to the transmission direction. The changeover switch unit 14 receives the electromagnetic waves generated by the signal generation unit 12 via the signal separation unit 13, switches the output destination, and outputs the received electromagnetic waves, and outputs the electromagnetic waves returning from the output destination to the signal separation unit 13. The sensor unit 15 irradiates the measurement target with the electromagnetic waves output by the changeover switch unit 14, and outputs the measurement target waves obtained by the irradiation to the changeover switch unit. The calibration standard unit 16 includes the circuits 21, 22, and 23 for a calibration standard, and the circuits 21, 22, and 23 receive the electromagnetic waves output by the changeover switch unit 14 and output generated reflected waves for calibration to the changeover switch unit 14. The signal reception unit 17 receives the measurement target waves and the reflected waves for calibration via the signal separation unit 13. The operation unit 32 receives the measurement value output by the signal reception unit 17 receiving the measurement target waves and the reflected waves for calibration, and corrects the received measurement value of the measurement target on the basis of the measurement value corresponding to the acquired reflected waves for calibration. The signal generation unit 12, the signal reception unit 17, the changeover switch unit 14, the sensor unit 15, and the signal separation unit 13 are formed in one circuit board 11 as the dielectric spectrometer 10.

Accordingly, in the dielectric spectroscopy measuring device 1, a connection to the circuits 21 to 23 included in the calibration standard unit 16 is made by the changeover switch unit 14 before the material under measurement that is the measurement target is measured, and error terms $E_D$, $E_S$, and $E_R$ can be calculated on the basis of a measurement value obtained when the circuits 21 to 23 are connected and the known true values of the circuits 21 to 23. The dielectric spectroscopy measuring device 1 can correct the measurement value obtained when measuring the material under measurement on the basis of the calculated error terms $E_D$, $E_S$, and $E_R$ and calculate the true value of the material under measurement, that is, the true value of the reflection coefficient of the material under measurement.

When measurement is continuously performed, the processing of steps S1 to S12 illustrated in FIG. 5 is repeatedly performed for each measurement, and the measurement value of the material under measurement can be corrected at any time on the basis of the measurement value at the time of connection to the circuits 21 to 23 obtained at a plurality of predetermined measurement times. Therefore, it is possible to perform stable measurement in which an influence of drift caused by change in the electrical characteristics of the circuit board 11 due to change in temperature of the circuit board 11 that occurring at the time of continuous measurement, signal change caused by change in oscillation mode of the signal generation unit 12, and the like has been reduced. Therefore, it is possible to realize a small device that can be attached to a living body, for example, when the measurement target is a person, by configuring the dielectric spectrometer 10 using the circuit board 11, and it is possible to reduce an influence of drift and improve the accuracy of the measurement when measurement is performed over a long period of time, such as when the measurement target is continuously measured. The plurality of predetermined measurement times may be random times or may be times at regular intervals.

In the dielectric spectroscopy measuring device 1 described above, the calculation unit 36 calculates the complex permittivity of the material under measurement on the basis of the corrected S11 parameter, which is the true value of the material under measurement, that is, the true value of the reflection coefficient of the material under measurement. On the other hand, the calculation unit 36 may quantify properties of the material under measurement instead of the complex permittivity of the material under measurement, on the basis of the true value of the reflection coefficient of the material under measurement.

In the flowchart illustrated in FIG. 5 above, the control unit 31 outputs the generation start instruction signal to the signal generation unit 12 in step S1. On the other hand, the control unit 31 does not output the generation start instruction signal to the signal generation unit 12, but may output the switching instruction signal to the changeover switch unit 14 in step S1 and then, may output the generation start instruction signal to the signal generation unit 12 between step S2 and step S3, between step S4 and step S5, between step S6 and step S7, and between step S8 and step S9, and output the generation end instruction signal to the signal generation unit 12 before outputting the next switching instruction signal to the changeover switch unit 14 in steps S4, S6, and S8. Accordingly, since it is possible to prevent the signal generation unit 12 from generating electromagnetic waves and outputting the electromagnetic waves to the transmission line 44 while the changeover switch unit 14 switches the connection destination of the transmission line 46, it is possible to prevent the signal reception unit 17 from receiving electromagnetic waves including noise generated at the time of switching while the changeover switch unit 14 performs switching.

In the flowchart illustrated in FIG. 5 above, the control unit 31 outputs the generation end instruction signal to the signal generation unit 12 and outputs the reception end instruction signal to the signal reception unit 17 in step S10. On the other hand, when the measurement is continuously performed, the processing of step S10 is not performed and the processing from step S2 may be continuously performed after the processing of step S13, and the control unit 31 may receive an operation of the user and perform the processing of step S10 at an arbitrary timing.

In the flowchart illustrated in FIG. 5, an order of the processing of steps S2 and S3 in which connection to the circuit 21 is made and measurement of the S11 parameter is performed, the processing of steps S4 and S5 in which connection to the circuit 22 in a short-circuited state is made and measurement of the S11 parameter is performed, and the processing of steps S6 and S7 in which connection to the circuit 23 in a terminated state is made and measurement of the S11 parameter is performed is not limited to an order of open, short circuit, and termination, and the order may be changed. In the flowchart illustrated in FIG. 5, the processing of steps S8 and S9 regarding the sensor unit 15 is performed after the processing of steps S2 to S7, but the processing of steps S8 and S9 may be performed between steps S1 and S2, between steps S3 and S4, or between steps S5 and S6.

(Another Configuration Example of Dielectric Spectroscopy Measuring Device: (1))

Figure 7:
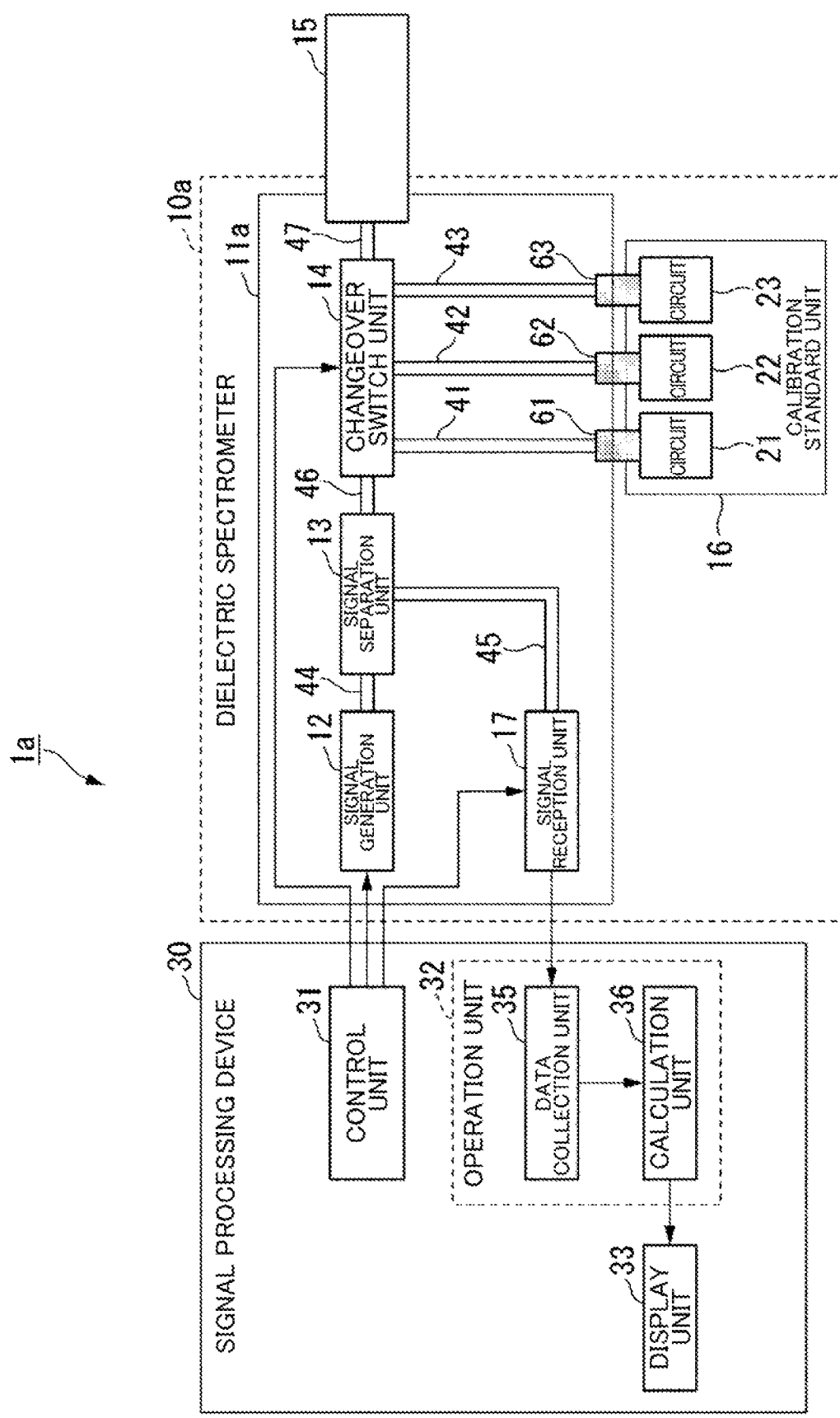
FIG. 7 is a block diagram illustrating another configuration example (1) of the dielectric spectroscopy measuring device according to the embodiment of the present invention.

FIG. 7 is a block diagram illustrating a configuration of a dielectric spectroscopy measuring device 1a, which is another configuration example of the dielectric spectroscopy measuring device 1. In the dielectric spectroscopy measuring device 1a, the same components as those of the dielectric spectroscopy measuring device 1 are denoted by the same reference signs, and different configurations will be described hereinafter, The dielectric spectroscopy measuring device 1a includes a dielectric spectrometer 10a and a signal processing device 30. The dielectric spectrometer 10a includes a circuit board 11a, a signal generation unit 12, a signal separation unit 13, a changeover switch unit 14, a sensor unit 15, a signal reception unit 17, transmission lines 41 to 47, high-frequency connectors 61, 62, and 63, and a calibration standard unit 16. In the circuit board 11a, the signal generation unit 12, the signal separation unit 13, the changeover switch unit 14, the sensor unit 15, the signal reception unit 17, the transmission lines 41 to 47, and the high frequency connectors 61, 62, 63 are integrated.

For the high-frequency connectors 61, 62, and 63, sub-miniature version A (SMA), SMK (2.92 mm connector), SMV (1.85 mm connector), subminiature push-on (SMP), subminiature push-on micro (SMPM), or the like is applied. The circuits 21, 22, and 23 included in calibration standard unit 16 are connected to high-frequency connectors 61, 62, and 63, respectively. This makes it possible for the circuit board 11a and the calibration standard unit 16 to be attached and detached. Processing performed by the dielectric spectroscopy measuring device 1a is the same as the processing performed by the dielectric spectroscopy measuring device 1 illustrated in FIG. 5.

In the dielectric spectroscopy measuring device 1a, when the transmission line lengths of the transmission lines 41, 42, and 43 are designed on the basis of Equation (1) above, it is necessary to design the transmission line lengths of the transmission lines 41, 42, and 43 in consideration of a transmission line length including the high-frequency connectors 61, 62, and 63.

(Another Configuration Example of Dielectric Spectroscopy Measuring Device: (2))

Figure 8:
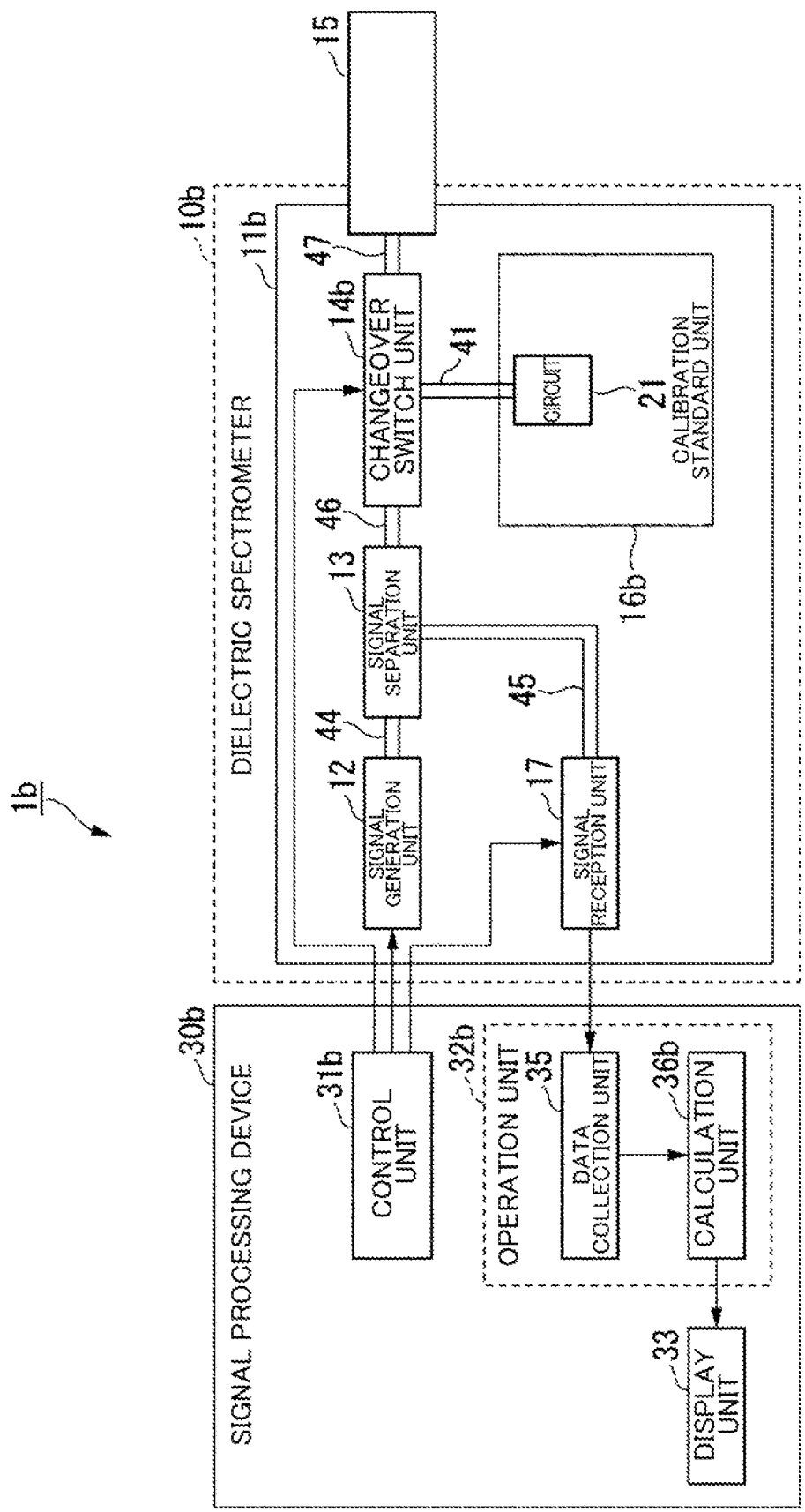
FIG. 8 is a block diagram illustrating another configuration example (2) of the dielectric spectroscopy measuring device according to the embodiment of the present invention.

FIG. 8 is a block diagram illustrating a configuration of a dielectric spectroscopy measuring device 1b, which is another configuration example of the dielectric spectroscopy measuring device 1. In the dielectric spectroscopy measuring device 1b, the same configurations as those of the dielectric spectroscopy measuring device 1 are denoted by the same reference signs, and different configurations will be described hereinafter.

The dielectric spectroscopy measuring device 1b includes a dielectric spectrometer 10b and a signal processing device 30b. The dielectric spectrometer 10b includes a circuit board 11b, a signal generation unit 12, a signal separation unit 13, a changeover switch unit 14b, a sensor unit 15, a signal reception unit 17, transmission lines 41 to 47, and a calibration standard unit 16b. In the circuit board 11b, the signal generation unit 12, the signal separation unit 13, the changeover switch unit 14b, the sensor unit 15, the signal reception unit 17, the transmission lines 41 to 47, and the calibration standard unit 16b are integrated. The calibration standard unit 16b includes a circuit 21 in an open state for calibration standard. The changeover switch unit 14b is a one-input and two-output switch, and performs switching from the transmission line 46 to any one of the transmission lines 41 and 47 in response to a switching instruction signal from the control unit 31b.

The signal processing device 30b includes a control unit 31b, an operation unit 32b, and a display unit 33. The control unit 31b has the same configuration as the control unit 31 except, for the switching instruction signal output to the changeover switch unit 14b. The control unit 31 has output the switching instruction signal for instructing the changeover switch unit 14 to switch the connection destination of the transmission line 46 to any one of the transmission lines 41, 42, and 43, and 47. On the other hand, the control unit 31b outputs a switching instruction signal for instructing the switching unit 14b to switch the connection destination of the transmission line 46 to any one of the transmission lines 41 and 47.

The operation unit 32b includes a data collection unit 35 and a calculation unit 36b. Since the calibration standard unit 16b includes only the circuit 21, the calculation unit 36b corrects the measurement value of the material under measurement that is received by the data collection unit 35 using Equation (9) below on the basis of the measurement value corresponding to the reflected waves for calibration corresponding to the circuit 21 received by the data collection unit 35.

[Math. 9]

$$S_{11\ corrected} = \frac{S_{11\ sens}}{S_{11\ Cal}} \quad (9)$$

In Equation (9). "$S_{11 Corrected}$" is a feather notation of the S11 parameter of the material under measurement after correction. "$S_{11 sens}$" is a feather notation of the S11 parameter of the material under measurement before correction, that is, the measurement value of the material under measurement that is output by the data collection unit 35 and received by the calculation unit 36b. "$S_{11 Cal}$" is a feather notation of the S11 parameter in the case of the circuit 21, that is, the measurement value in the case of the circuit 21 output by the data collection unit 35 and received by the calculation unit 36b. As can be seen from Equation (9), the calculation unit 36b performs correction on the basis of a ratio between the measurement value in the case of the circuit 21 and the measurement value of the material under measurement before correction.

The dielectric spectroscopy measuring device 1b performs the processing of steps S8 to S10 after the processing of steps S1 to S3 among the processing performed by the dielectric spectroscopy measuring device 1 illustrated in FIG. 5. Thereafter, the calculation unit 36b of the dielectric spectroscopy measuring device 1b performs processing of correcting the S11 parameter of the material under measurement using Equation (9) above instead of the processing of steps S11 and S12, and then performs the processing of step S13. Processing of the control unit 31 is performed by the control unit 31b, processing of the changeover switch unit 14 is performed by the changeover switch unit 14b, and in step S8, the control unit 31b performs processing of outputting a switching instruction signal for connecting the transmission line 46 to the sensor unit 15 to the changeover switch unit 14b when a predetermined time elapses after outputting the switching instruction signal for connection to the circuit 21 of the calibration standard unit 16b.

Although a case in which the calibration standard unit 16b of the dielectric spectroscopy measuring device 1b includes the open circuit 21 is illustrated in FIG. 8, the calibration standard unit 16b may include only the short circuit 22 or may include only the termination circuit 23. Further, in the case of the calibration standard unit 16b including one circuit, uniform frequency characteristics are desirable and thus, the short circuit 22 is most suitable, and in the case of the short circuit 22, there is also an advantage that it is difficult to receive an influence of peripheral circuits.

(Results of Performing)

Figure 9:
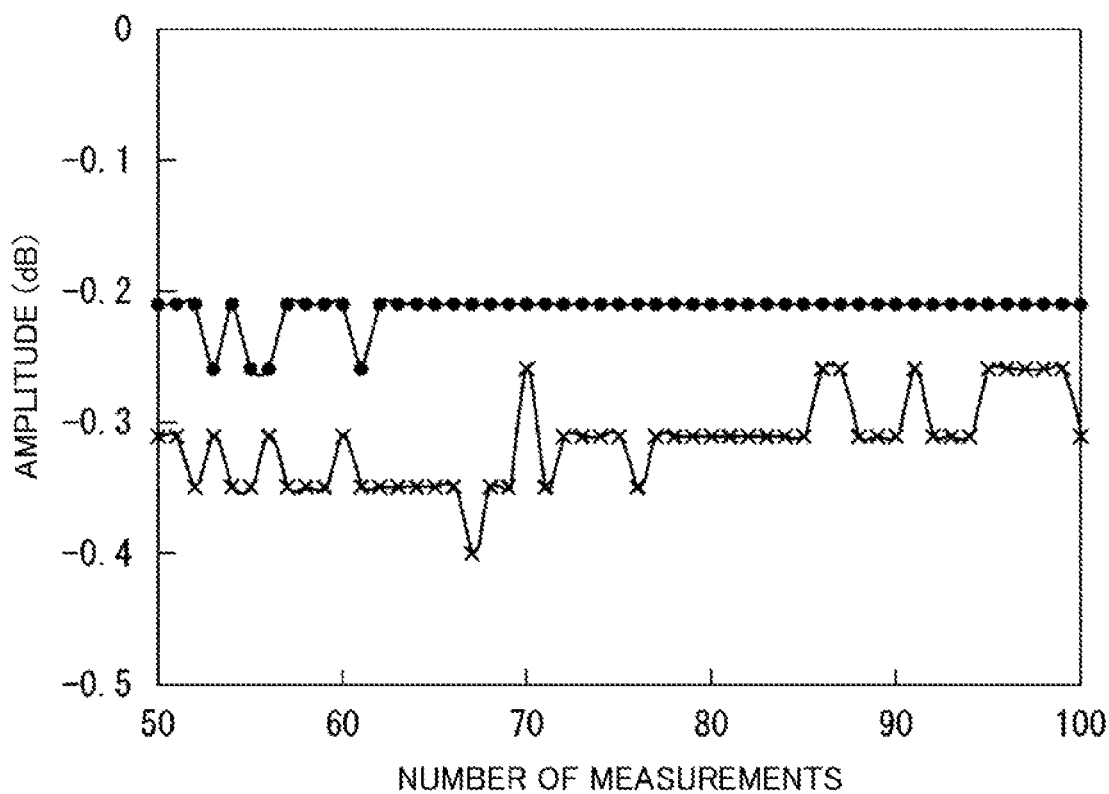
FIG. 9 is a graph illustrating results of performing measurement with air as a measurement target using a short circuit as a calibration standard in another configuration example (2) of the dielectric spectroscopy measuring device according to the embodiment of the present, invention.

FIG. 9 is a graph illustrating a change in amplitude of the S11 parameter of the measurement target when continuous measurement is performed with the measurement target as air in a case in which the calibration standard unit 16b includes only the short circuit 22 in the dielectric spectroscopy measuring device 1b illustrated in FIG. 8. In FIG. 9, a vertical axis is an amplitude (dB) of the S11 parameter of the measurement target, and a horizontal axis is the number of measurements. In FIG. 9, a polygonal line connecting points marked with black circles indicates a change in amplitude of the S11 parameter when the dielectric spectroscopy measuring device 1b in which the calibration standard unit 16b includes only the short circuit 22 is used. A polygonal line connecting points marked with crosses indicates a change in amplitude of the S11 parameter when the dielectric spectroscopy measuring device 1b measures the measurement target without using the calibration standard unit 16b, that is, the S11 parameter of the measurement target before correction. As can be seen from the graph in FIG. 9, it can be seen that stable measurement can be performed in a case in which the calibration standard unit 16b is used as compared with a case in which the calibration standard unit 16b is not used.

Figure 10:
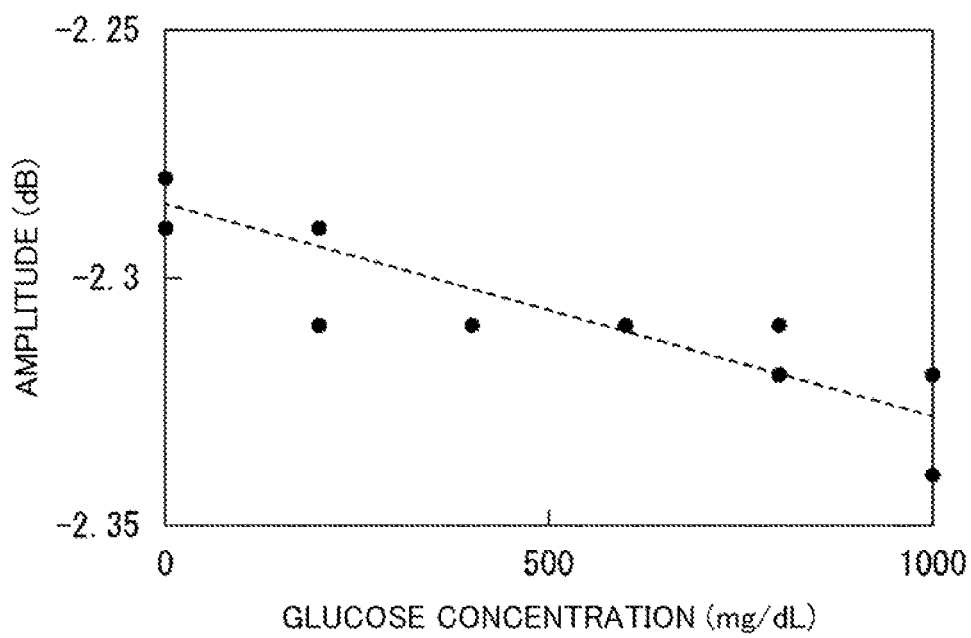
FIG. 10 is a graph illustrating results of performing measurement with a glucose aqueous solution as a measurement target using a short circuit as a calibration standard in another configuration example (2) of the dielectric spectroscopy measuring device according to the embodiment of the present invention.
Figure 11:
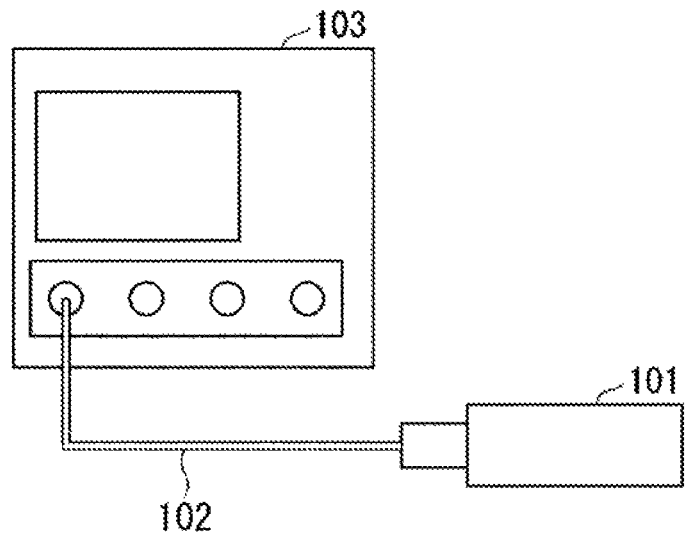
FIG. 11 is a block diagram illustrating a configuration of a device that performs measurement using a coaxial probe of the related art.
Figure 12:
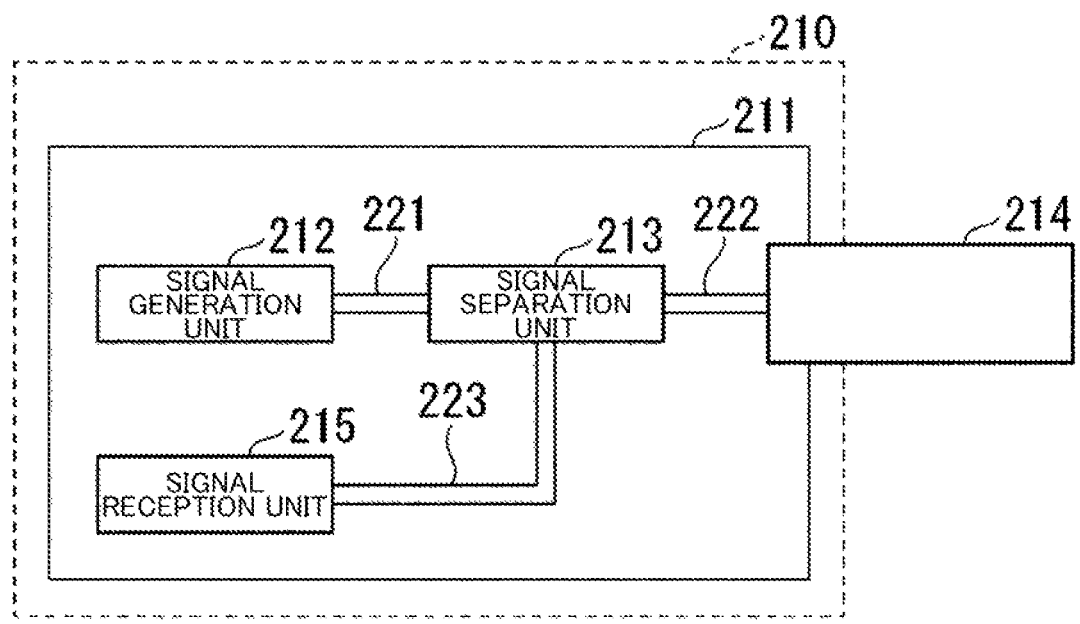
FIG. 12 is a block diagram illustrating a device configuration when a device that performs measurement using a coaxial probe is formed on a circuit board.

FIG. 10 is a graph which illustrates a change in amplitude of the S11 parameter when the measurement target is a glucose aqueous solution in a case in which the calibration standard unit 16b includes only the short circuit 22 in the dielectric spectroscopy measuring device 1b illustrated in FIG. 8, similar to FIG. 9. In FIG. 10, a vertical axis is an amplitude (dB) of the S11 parameter of the measurement target, and a horizontal axis is a glucose concentration (mg/dL). In FIG. 10, black circle marks are the S11 parameters after correction, and a dashed line is an approximate straight line. As can be seen from the approximate straight line, as the glucose concentration increases, the amplitude decreases, and a change in the S11 parameter of the measurement target corrected by the dielectric spectroscopy measuring device 1b in which the calibration standard unit 16b includes only the short circuit 22 changes depending on a change in glucose concentration.

The signal processing devices 30 and 30b in the above-described embodiments may be realized by a computer. In this case, the functions may be realized by recording a program for realizing the functions on a computer-readable recording medium, loading the program recorded on the recording medium into a computer system, and executing the program. The "computer system" described herein includes an OS or hardware such as a peripheral device. Further, the "computer-readable recording medium" refers to a portable medium such as a flexible disk, a magneto-optical disc, a ROM, or a CD-ROM, or a storage device such as a hard disk built into the computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system serving as a server or a client in such a case. Further, the program may be a program for realizing some of the above-described functions, may be a program capable of realizing the above-described functions in a combination with a program already recorded on the computer system, or may be a program realized using a programmable logic device such as an FPGA.

Although the embodiments of the present invention have been described above in detail with reference to the drawings, a specific configuration is not limited to the embodiments, and includes a design or the like without departing from the gist of the present invention.

INDUSTRIAL APPLICABILITY

The present invention can be used for measurement of, for example, a complex permittivity of a solution existing in a human or an animal and a solution collected from a human or an animal.

REFERENCE SIGNS LIST

1 Dielectric spectroscopy measuring device
10 Dielectric spectrometer
11 Circuit board
12 Signal generation unit
13 Signal separation unit
4 Changeover switch unit
15 Sensor unit
16 Calibration standard unit
17 Signal reception unit
21, 22, 23 Circuit
41 to 47 Transmission line
30 Signal processing device
31 Control unit
32 Operation unit
33 Display unit
35 Data collection unit
36 Calculation unit

The invention claimed is:

1. A dielectric spectroscopy measuring device comprising:
a signal generator configured to generate electromagnetic waves;
a signal separator configured to separate the electromagnetic waves according to a transmission direction and output the separated electromagnetic waves to an output destination corresponding to the transmission direction;
a changeover switch configured to receive the electromagnetic waves generated by the signal generator via the signal separator, switch an output destination, and output the received electromagnetic waves, and to output electromagnetic waves returning from the output destination to the signal separator;
a sensor configured to irradiate a measurement target with the electromagnetic waves output by the changeover switch, and output measurement target waves obtained by irradiation to the changeover switch;

a calibration standard including a circuit for a calibration standard, the circuit outputting reflected waves for calibration generated by receiving the electromagnetic waves output by the changeover switch to the changeover switch;

a signal receiver configured to receive the measurement target waves and the reflected waves for calibration via the signal separator; and an operator configured to receive a measurement value output by the signal receiver receiving the measurement target waves and the reflected waves for calibration, and correct the received measurement value of the measurement target on the basis of the measurement value corresponding to the received reflected waves for calibration, wherein the signal generator, the signal receiver, the changeover switch, the sensor, and the signal separator are formed on one circuit board as a dielectric spectrometer, wherein the signal generation unit configured to generate the electromagnetic waves from after the switching of an output destination by the changeover switch unit until before the next switching.

2. The dielectric spectroscopy measuring device according to claim 1, wherein the circuits included in the calibration standard include any one or all of an open circuit configured to bring a tip of a transmission line connected to the circuit into an open state, a short circuit configured to bring the tip of the transmission line connected to the circuit into a short-circuited state, and a termination circuit configured to bring the tip of the transmission line connected to the circuit into a terminated state.

3. The dielectric spectroscopy measuring device according to claim 2, wherein, when the circuits included in the calibration standard are all of the open circuit, the short circuit, and the termination circuit, the changeover switch connects three circuits including the open circuit, the short circuit, and the termination circuit to each of the sensors through switching, and the operator corrects the measurement value of the measurement target on the basis of the measurement value corresponding to the reflected waves for calibration of each of the three circuits and a known true value of the reflection coefficient of each of the three circuits.

4. The dielectric spectroscopy measuring device according to claim 2, wherein, when any one of the circuits included in the calibration standard is determined to be any one of the open circuit, the short circuit, and the termination circuit in advance, the changeover switch connects the one circuit determined in advance to the sensor through switching, and the operator corrects the measurement value of the measurement target by dividing the measurement value of the measurement target by the measurement value corresponding to the reflected waves for calibration of the one circuit determined in advance.

5. The dielectric spectroscopy measuring device according to claim 1, wherein the calibration standard is formed on the circuit board, or the calibration standard is connected to the circuit board.

6. The dielectric spectroscopy measuring device according to claim 1, wherein the operator calculates a difference in transmission loss and phase difference between a path leading to the sensor via the changeover switch and a path leading to the circuit of the calibration standard via the changeover switch in advance, and corrects the measurement value of the measurement target on the basis of the difference in the transmission loss and the phase difference calculated in advance and the measurement value of the reflected waves for calibration.

7. A dielectric spectroscopy measuring device comprising:

a signal generator configured to generate electromagnetic waves;

a signal separator configured to separate the electromagnetic waves according to a transmission direction and output the separated electromagnetic waves to an output destination corresponding to the transmission direction;

a changeover switch configured to receive the electromagnetic waves generated by the signal generator via the signal separator, switch an output destination, and output the received electromagnetic waves, and to output electromagnetic waves returning from the output destination to the signal separator;

a sensor configured to irradiate a measurement target with the electromagnetic waves output by the changeover switch, and output measurement target waves obtained by irradiation to the changeover switch;

a calibration standard including a circuit for a calibration standard, the circuit outputting reflected waves for calibration generated by receiving the electromagnetic waves output by the changeover switch to the changeover switch;

a signal receiver configured to receive the measurement target waves and the reflected waves for calibration via the signal separator; and an operator configured to receive a measurement value output by the signal receiver receiving the measurement target waves and the reflected waves for calibration, and correct the received measurement value of the measurement target on the basis of the measurement value corresponding to the received reflected waves for calibration, wherein the signal generator, the signal receiver, the changeover switch, the sensor, and the signal separator are formed on one circuit board as a dielectric spectrometer, wherein, when an effective wavelength of the measurement target in the electromagnetic waves is determined in advance, a transmission length of a transmission line between the changeover switch and the calibration standard, and a transmission length of a transmission line between the changeover switch and the sensor are determined in advance according to the effective wavelength.

8. A dielectric spectroscopy measuring method performed by a dielectric spectroscopy measuring device in which a signal generator, a signal receiver, a changeover switch, a sensor, and a signal separator are formed as a dielectric spectrometer on one circuit board, the dielectric spectroscopy measurement method comprising:

generating, by the signal generator, electromagnetic waves;

receiving, by the signal separator, the electromagnetic waves generated by the signal generator, and outputting the received electromagnetic waves to the changeover switch;

receiving, by the changeover switch, the electromagnetic waves generated by the signal generator via the signal separator, switching an output destination, and outputting the received electromagnetic waves;

outputting, by a circuit for a calibration standard, reflected waves for calibration generated by receiving the electromagnetic waves output by the changeover switch to the changeover switch;

outputting, by the changeover switch, the reflected waves for calibration returning from the output destination to the signal separator;

irradiating, by the sensor, a measurement target with the electromagnetic waves output by the changeover switch, and outputting measurement target waves obtained by the irradiation to the changeover switch;

outputting, by the changeover switch, the measurement target waves returning from the output destination to the signal separator;

outputting, by the signal separator, the measurement target waves and the reflected waves for calibration to the signal receiver;

receiving, by the signal receiver, the measurement target waves and the reflected waves for calibration; and receiving, by an operator, a measurement value output by the signal receiver receiving the measurement target waves and the reflected waves for calibration, and correcting the received measurement value of the measurement target on the basis of the measurement value corresponding to the received reflected waves for calibration, generating, by the signal generation unit, the electromagnetic waves from after the switching of an output destination by the changeover switch unit until before the next switching.

* * * * *